US012775687B2

(12) United States Patent
Venkatesan et al.

(10) Patent No.: US 12,775,687 B2
(45) Date of Patent: Oct. 27, 2026

(54) METHODS AND APPARATUS FOR ALIASING SCOPES IN ACCESS TOKENS

(71) Applicant: Musarubra US LLC, San Jose, CA (US)

(72) Inventors: Senthil Kumar Venkatesan, Bangalore (IN); Wayne Helm Gibson, Crawley (GB)

(73) Assignee: Musarubra US LLC, San Jose, CA (US)

( * ) Notice: Subject to any disclaimer, the term of this patent is extended or adjusted under 35 U.S.C. 154(b) by 356 days.

(21) Appl. No.: 18/494,646

(22) Filed: Oct. 25, 2023

(65) Prior Publication Data

US 2025/0139211 A1 May 1, 2025

(51) Int. Cl.
*G06F 21/31* (2013.01)

(52) U.S. Cl.
CPC .................................... *G06F 21/31* (2013.01)

(58) Field of Classification Search
CPC ........ G06F 21/31; H04L 63/083; H04L 63/10
See application file for complete search history.

(56) References Cited

U.S. PATENT DOCUMENTS 8,843,997 B1 * 9/2014 Hare ................... H04L 63/0815 709/200
11,516,200 B2 * 11/2022 Volini ..................... H04L 63/08
11,770,376 B2 * 9/2023 Cook .................... H04L 9/0891 726/5
2010/0235286 A1 * 9/2010 Moore ............... G06Q 20/3821 705/26.1
2015/0319158 A1 * 11/2015 Kumnick ............. G06Q 20/385 726/9
2016/0283473 A1 * 9/2016 Heinze .................... G06F 16/22
2017/0034172 A1 * 2/2017 Biggs ...................... H04L 63/08
2018/0101857 A1 * 4/2018 Deliwala .............. G06Q 20/387
2018/0295135 A1 * 10/2018 Feijoo ..................... H04L 63/10
2019/0149511 A1 * 5/2019 Dias ........................ H04L 12/12 726/5
2020/0153838 A1 * 5/2020 Ge ........................ H04L 63/102
(Continued)

OTHER PUBLICATIONS

J. Liu, S. Wan and X. He, "Alias-Chain: Improving Blockchain Scalability via Exploring Content Locality among Transactions," 2022 IEEE International Parallel and Distributed Processing Symposium (IPDPS), Lyon, France, 2022, pp. 1228-1238. (Year: 2022).*
(Continued)

*Primary Examiner* — Kari L Schmidt
(74) *Attorney, Agent, or Firm* — Hanley, Flight & Zimmerman, LLC

(57) ABSTRACT

Systems, apparatus, articles of manufacture, and methods are disclosed for aliasing scopes in access tokens. An example apparatus includes interface circuitry, machine readable instructions, and programmable circuitry to at least one of instantiate or execute the machine readable instructions to detect a request to create an identity to access an online resource, the message including at least one scope assignment associated with a user of the computing device, determine that an alias has not been created for the at least one scope assignment, the alias to represent two more scopes assigned to the user, and generate the alias for the scope assignment, the alias having less characters than the scope assignment.

18 Claims, 11 Drawing Sheets

(56) References Cited

U.S. PATENT DOCUMENTS

| | | | | |
|---|---|---|---|---|
| 2020/0273032 | A1* | 8/2020 | Narayan | G06Q 20/322 |
| 2022/0232003 | A1* | 7/2022 | Smolny | H04L 63/20 |
| 2022/0232010 | A1* | 7/2022 | Zhang | G06F 21/44 |
| 2023/0093122 | A1* | 3/2023 | Pateriya | H04L 63/10 726/4 |
| 2023/0222227 | A1* | 7/2023 | Sankaranarayanan | G06F 9/545 726/26 |
| 2023/0325520 | A1* | 10/2023 | Kozlov | G06F 21/33 726/4 |
| 2024/0305633 | A1* | 9/2024 | Paulraj | H04L 63/0823 |

OTHER PUBLICATIONS

Tuecke, Steven, et al. "Globus Auth: A research identity and access management platform." 2016 IEEE 12th International Conference on e-Science (e-Science). IEEE, 2016, pp. 203-212. (Year: 2016).*

* cited by examiner

METHODS AND APPARATUS FOR ALIASING SCOPES IN ACCESS TOKENS

FIELD OF THE DISCLOSURE

This disclosure relates generally to access tokens and, more particularly, to methods and apparatus for aliasing scopes in access tokens.

BACKGROUND

Authentication tokens allow users to verify their identity and, in return, receive a unique access token. During a life of the token, users can access a webpage, application, online resource, etc., that the token has been issued for, rather than needing to re-enter valid user credentials each time they desire to return to the webpage, application, online resource, etc. Therefore, authentication tokens act like a stamped ticket: the user retains access as long as the token remains valid. Once the user logs out, quits, signs off, etc., the token is invalidated.

Figure 1:
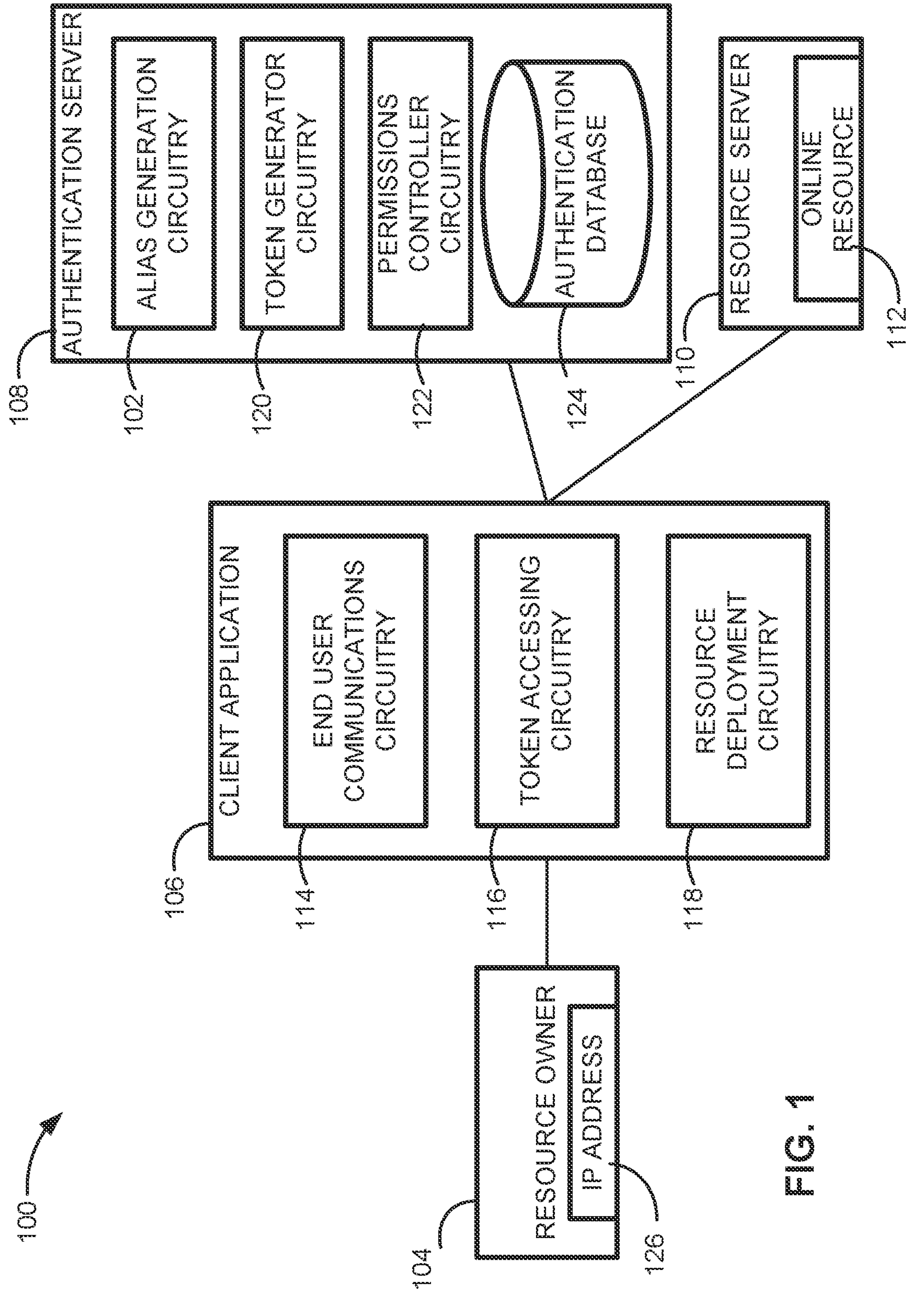
FIG. 1 is a block diagram of an example authentication system in which example alias generation circuitry operates to generate alias scopes for access tokens.

In general, the same reference numbers will be used throughout the drawing(s) and accompanying written description to refer to the same or like parts. The figures are not necessarily to scale. Unless specifically stated otherwise, descriptors such as “first,” “second,” “third,” etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor “first” may be used to refer to an element in the detailed description, while the same element may be referred to in a claim with a different descriptor such as “second” or “third.” In such instances, it should be understood that such descriptors are used merely for identifying those elements distinctly within the context of the discussion (e.g., within a claim) in which the elements might, for example, otherwise share a same name.

DETAILED DESCRIPTION

Open Authorization (OAuth) is an authorization system that enables an end user’s account information to be used by third-party services without exposing the user’s credentials to the third-party. OAuth acts as an intermediary on behalf of the end user, providing the third-party service with an access token that authorizes specific end user account information (e.g., files, emails, contacts, etc.) to be shared. The OAuth system provides users with an access token after users have initially provided authentication credentials such as a user name, a password, an identification number, an answer to a security question, an account number, or other types of authentication credentials. The access token enables the user to repeatedly access resources and other protected services of the third-party service without repeatedly providing authentication credentials. This can be very convenient to users as it allows them to access resources and/or services of the third-party service again and again without undergoing the hassle of providing authentication credentials. Additionally, the third-party service receives the access token, but not the user credentials. As such, the user credentials are protected from hackers, malware, etc.

An access token is an object representing the subject of access control operations. For example, an access token is a string that the OAuth client (e.g., a user of the OAuth system) uses to make requests to a third-party service. In some examples, the access token informs the third-party service what the user has access to. In some examples, the information in the access token related to what the user has access to is referred to as a “scope.” A scope is a permission. In order to access a particular resource in a third-party service, a user has to have a particular scope assigned to a corresponding user identity. For example, a user may need an appropriate scope, provided in the access token, to sign into an email account. More generally, scopes include whether the user can read resources from the third-party service, write to resources from the third-party service, create resources in the third-party service, or delete resources (e.g., delete data, objects, etc.) from the third-party service. Therefore, scopes included in the access token inform the third-party service what requests from a client should be allowed and what requests from a client are prohibited.

Although access tokens provide benefits to users and third-party services, there are problems that occur with such access tokens. As third-party services, such as applications, develop over time, new scopes can be added to the user's access token. For example, when an application is upgraded by a developer, the upgrade enables users to create or delete features of the application. As such, a new scope is assigned to the user's access token to enable them (the user) to create or delete those features. Therefore, third-party services may provide the user with options for many scopes because, as features are added, new scopes are required. As a result, the size (e.g., bit size) of the access token increases. This increase in size causes issues with web servers. For example, web servers (e.g., a server or web browser program that stores and delivers content for a website, such as text, images, video, and application data) may accept a limited HTTP header size (e.g., 8 KB, 10 KB, etc.). Additionally, the increased size of the access token increases the utilization of network bandwidth.

A secondary issue is that access tokens are not encrypted. Instead of encryption, access tokens are signed. For example, access tokens use private/public key pairs to sign and verify access to specific resources (e.g., documents, programs, etc.). However, because the access tokens are not encrypted, they are visible to anyone. Usually every resource owner defines identity authentication measurement (IAM) scopes based on a) the service where the resource exists and b) the resource name and operations that can be performed on that service. An example IAM scope may look like "service.resource.[c,r,u,d]", where "c, r, u, d," refers to create, read, update, delete. If a scope becomes directly visible in the token (e.g., because the third-party service has not taken measures to hide the scopes), then a malicious actor can gain access to the resources being exposed by a service. Even though encrypting access tokens would facilitate preventing malicious actors from gaining access to resources exposed by the third-party service, such encryption causes latency to authentication.

Therefore, examples disclosed herein create an alias scope. As described further herein, an "alias" or "alias scope" is a value (e.g., numerical, alpha-numerical, etc.) that represents one or more scopes assigned to a user. The alias scope reduces the size of an access token and obfuscates the one or more scopes in the access token without having to encrypt the token. In some examples, the OAuth server enables an administrator to create an alias for one or more scopes. In some examples, the OAuth server dynamically creates an alias for one or more scopes.

FIG. 1 is a block diagram of an example authentication system 100 in which example alias generation circuitry 102 operates to generate alias scopes for access tokens. The example authentication system 100 includes an example resource owner 104, an example client application 106, an example authentication server 108, and an example resource server 110 that operates an example online resource 112. The client application 106 includes example end user communications circuitry 114, example token accessing circuitry 116, and example resource deployment circuitry 118. Examples disclosed herein are described with respect to an example OAuth system. However, examples disclosed herein may be implemented in any authentication system.

The resource owner 104 creates an identity in order to own the data (e.g., files, pictures, emails, etc.) that resides in the online resource 112. The example resource owner 104 can be an end user (e.g., employee, student, etc.) who requests to create an identity to access to the online resource 112 (e.g., Microsoft 365). To do so, the resource owner 104 uses the client application 106 (e.g., Google web browser, Yahoo web browser, mobile app, etc.) on an example device and navigates to the online resource 112. For example, the resource owner 104 causes the client application 106 to transmit a HTTP request requesting to create an access to the online resource 112. The end user communications circuitry 114 prompts the resource owner 104 to enter user identity details (e.g., user credentials, such as a username and password). Before the client application 106 can display/access the online resource 112, the end user communications circuitry 114 prompts the resource owner 104 to enter desired scopes (e.g., create, read, update, delete) for the online resource 112. For example, the resource owner 104 enters and/or selects what type of access he/she is to have to the online resource 112. In some examples, this access can include a subscription-type access, a management-type access, and/or a simple resource-type access. Within each type of access, the resource owner 104 can identify what sub-type of access he/she wants to the online resource 112. For example, the resource owner 104 enters and/or selects whether he/she wants to be able to read, write, create, update, or delete the online resource 112. These "accesses" are referred to as scopes. In some examples, when resource owner 104 enters and/or selects what scopes he/she wants, those scopes are assigned to the identity of the user and referred to as scope assignments. In some examples, a scope assignment can include a single scope or a combination of scopes. Then, the client application 106 transmits the user credentials and the scopes to the authentication server 108.

In some examples, the resource owner 104 requests access (e.g., rather than requesting creation of an identity) to the online resource 112. In this example, the resource owner 104 uses the client application 106 (e.g., Google web browser, Yahoo web browser, mobile app, etc.) on the example device and navigates to the online resource 112. Before the client application 106 can display/access the online resource 112, the end user communications circuitry 114 prompts the resource owner 104 to enter user credentials (e.g., username and password). Then, the client application 106 transmits the user credentials to the authentication server 108.

The example authentication server 108 is an OAuth server that includes the example alias generation circuitry 102, example token generator circuitry 120, example permissions controller circuitry 122, and an example authentication database 124. The example authentication server 108 may be implemented by one or more servers and/or cloud services to provide authentication information associated with queries from resource owners (e.g., the resource owner 104). The example alias generation circuitry 102 looks up and/or generates an alias (alias scope) for the scopes associated with the user credentials, which is described in further detail below in connection with FIG. 2. The example token generator circuitry 120 generates an access token (e.g., OAuth token) based on the user credentials and the alias scope(s) and/or scope assignment(s). The example permissions controller circuitry 122 accesses the access token and determines whether to transmit the access token to the client application 106.

In some examples, the token accessing circuitry 116 accesses the token from the permissions controller circuitry 122. In other words, the authentication server 108 authenticates the request associated with the resource owner 104 by transmitting the token to the client application 106. As such, the resource deployment circuitry 118 requests the online resource 112 from the resource server 110 and provides the online resource 112 to the resource owner 104. Thus, the resource owner 104 can access the data in the online resource 112.

In some examples, the authentication server 108 may reject (e.g., unauthorize, limit, etc.) a request to access the online resource 112. In particular, the example permissions controller circuitry 122 may withhold the access token based on an identifier (e.g., an example IP address 126) of the example device associated with the request (e.g., the HTTP request). For example, an unauthorized user may attempt to gain access to the online resource 112. The example permissions controller circuitry 122 can identify the unauthorized user because the device identifier associated with the request may not match the device identifier associated with the resource owner 104.

Figure 2:
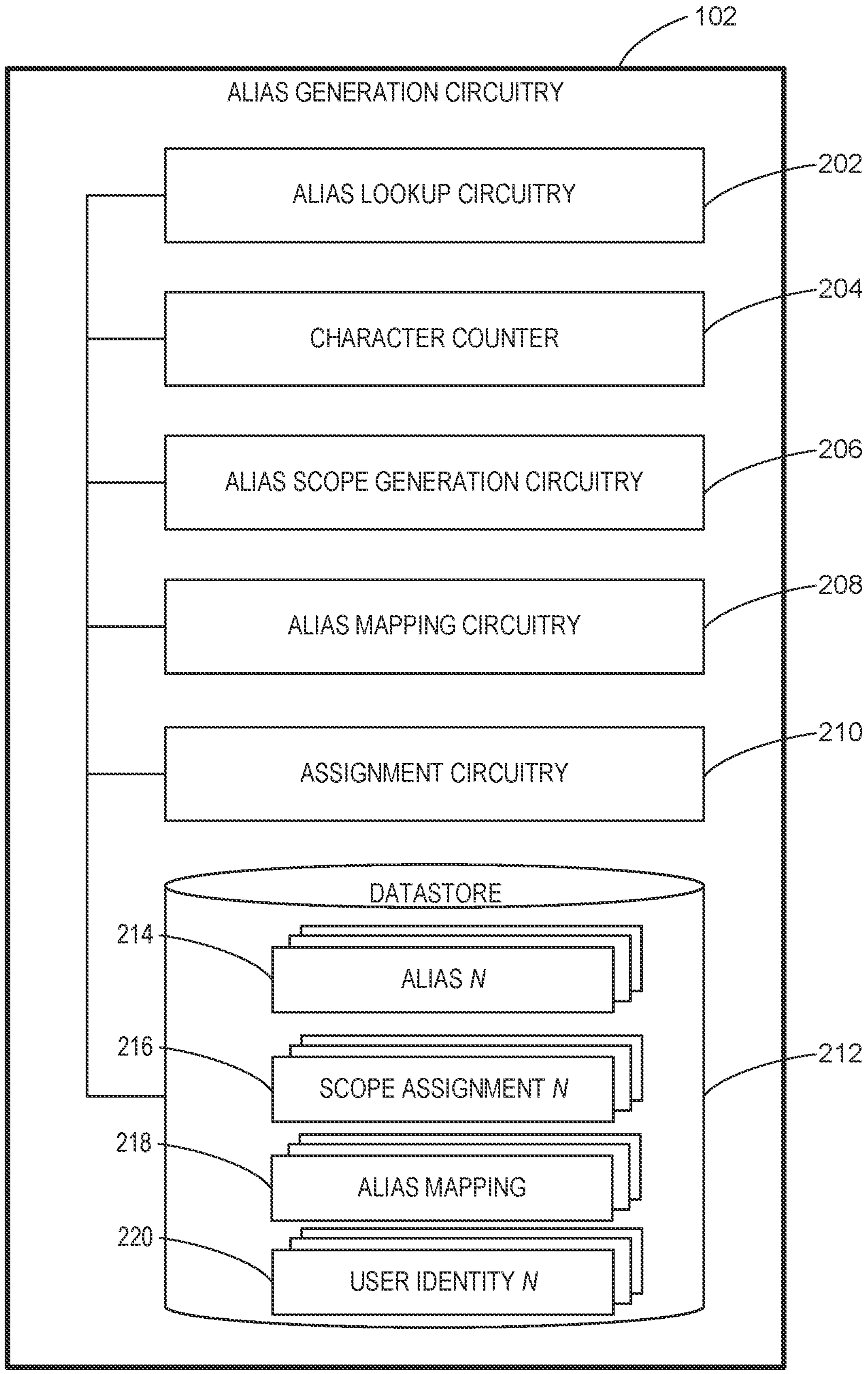
FIG. 2 is a block diagram of an example implementation of the alias generation circuitry of FIG. 1.

FIG. 2 is a block diagram of an example implementation of the alias generation circuitry 102 of FIG. 1 to generate aliases for scope assignments corresponding to a user. The alias generation circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the alias generation circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example alias generation circuitry 102 includes example alias lookup circuitry 202, an example character counter 204, example alias scope generation circuitry 206, example alias mapping circuitry 208, example assignment circuitry 210, and an example datastore 212. In some examples, the alias lookup circuitry 202 is instantiated by programmable circuitry executing alias lookup instructions and/or configured to perform operations such as those represented by the flowchart(s) of FIGS. 3 and 4. In some examples, the character counter 204 is instantiated by programmable circuitry executing character counter instructions and/or configured to perform operations such as those represented by the flowchart(s) of FIGS. 3 and 4. In some examples, the alias scope generation circuitry 206 is instantiated by programmable circuitry executing alias scope generation instructions and/or configured to perform operations such as those represented by the flowchart(s) of FIGS. 3 and 4. In some examples, the alias mapping circuitry 208 is instantiated by programmable circuitry executing alias mapping instructions and/or configured to perform operations such as those represented by the flowchart(s) of FIGS. 3 and 4. In some examples, the assignment circuitry 210 is instantiated by programmable circuitry executing assigning instructions and/or configured to perform operations such as those represented by the flowchart(s) of FIGS. 3 and 4.

In FIG. 2, the example alias lookup circuitry 202 executes a lookup for aliases. In some examples, a lookup for aliases includes identifying an alias that corresponds to a scope assignment. An alias is a representation of a scope assignment. For example, an alias may be a hexadecimal value corresponding to and/or identifying a scope assignment. A hexadecimal value has a base of 16 and, thus, is shorter (e.g., less characters) than a scope assignment having two or more scopes. Additionally or alternatively, an alias may be a globally unique identifier (GUID) corresponding to and/or identifying a scope assignment. A GUID is a 128 bit string that represents an identification (e.g., a scope assignment). In some examples, a GUID can be used as an alias when the scope assignment is greater than 128 bits. Additionally or alternatively, an alias may be any random value, where the random value includes a number of characters less than a number of characters included in the scope assignment.

In some examples, the alias lookup circuitry 202 receives a scope assignment and determines whether an alias has been created for the combination of scopes in the scope assignment. In some examples, the alias lookup circuitry 202 does this based on scope mappings, discussed in further detail below in connection with the alias mapping circuitry 208. Additionally and/or alternatively, the example alias lookup circuitry 202 executes any type of matching algorithm to determine whether the combination of scopes in the scope assignment have a corresponding alias. The example alias lookup circuitry 202 performs lookups in the datastore 212. For example, the datastore 212 includes one or more aliases 214 and one or more scope assignments 216. An example alias n 214 may correspond to an example scope assignment n 216. In such an example, the alias lookup circuitry 202 determines that an alias exists for a particular scope assignment.

In some examples, before the alias lookup circuitry 202 determines whether an alias has been created for the combination of scopes in the scope assignment, the alias lookup circuitry 202 determines how many scopes are in the scope assignment. In some examples, if the alias lookup circuitry 202 determines that less than a predefined number of scopes (e.g., three (3) scopes) are in the scope assignment, the alias lookup circuitry 202 does not perform a lookup in the datastore 212. If the alias lookup circuitry 202 determines that at least three (3) scopes are included in the scope assignment, then the alias lookup circuitry 202 performs the lookup.

The example alias lookup circuitry 202 notifies the character counter 204 when an alias has not been found. For example, when no alias exists for the scope assignment, the alias lookup circuitry 202 informs the character counter 204 to parse and analyze a number of characters in the scope assignment. In some examples, when an alias exists for the scope assignment, the alias lookup circuitry 202 provides the alias to the example assignment circuitry 210 to assign the alias to the user credentials.

In some examples, the alias lookup circuitry 202 includes means for looking up aliases. For example, the means for looking up aliases may be implemented by alias lookup circuitry 202. In some examples, the alias lookup circuitry 202 may be instantiated by programmable circuitry such as the example programmable circuitry 812 of FIG. 8. For instance, the alias lookup circuitry 202 may be instantiated by the example microprocessor 900 of FIG. 9 executing machine executable instructions such as those implemented by at least block 506 of FIG. 5. In some examples, the alias lookup circuitry 202 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the alias lookup circuitry 202 may be instantiated by any other combination of hardware, software, and/or firmware. For example, the alias lookup circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In FIG. 2, the example character counter 204 counts a total number of characters in the scope assignment. As described above, the scope assignment may include a single scope or a combination of scopes. In some examples, the nomenclature of the scope makes the scope long in character size. For example, a first scope assignment includes the following four scopes: ResourceA.scope.read, ResourceA.scope.write, ResourceB.scope.read, ResourceB.scope.write. In this example, the first scope assignment includes eighty (80) characters. In such an example, eighty (80) characters is long in size. For example, when token generator circuitry, such as token generator circuitry 120 (FIG. 1), generates an access token, the token generator circuitry includes all of the scopes associated with the user in the payload of the access token. In some examples, the payload also includes the user credentials (e.g., username, identifier), user roles (e.g., moderator, manager, administrator, etc.), and permissions (e.g., scopes). If a user has a scope assignment that is eighty (80) characters long, the access token for the user is going to have a big payload and, thus, the access token will be a longer string relative to an access token having a scope assignment with less than eighty (80) characters.

The following example is of a JavaScript Object Notation (JSON) web token (JWT) (e.g., an access token, OAuth token) associated with user identifier (ID) 123:

```
>>> token = jwt.encode({
... 'user_id': 123,
... 'username': 'taylor',
... 'roles': ['user', 'moderator']
... 'scopes': [ResourceA.scope.read, ResourceA.scope.write,
ResourceB.scope.read, ResourceB.scope.write]
... }, secret_key, algorithm='HS256')
>>> token
'eyJ0eXAiOiJKV1QiLCJhbGciOiJIUzIlNiJ9.eyJ1c2VyX2lkIjoxMj
MsInVzZXJuYW1lIjoic3VzYW4iLCJyb2xlcyI6WyJ1c2VyIiwibW9k
ZXJhdG9yIl19.fRZ4ButrxgElKB58TlunFo4bGGHponRJcV54NMF-
hgM'
```

The "jwt.encode( )" function has three arguments. The first argument is the payload and includes the "user_id", the "username", the "roles", and the "scopes". The second argument is a secret key ("secret_key"). The secret key is a string that is used in an algorithm that generates a cryptographic signature for the access token. In some examples, this key is known by the authentication server 108 (FIG. 1), but not by any other server, because anyone who is in possession of this key can generate new tokens with valid signatures. The third argument in the JWT is the signing algorithm ("algorithm='HS256'"). Most servers use the HS256 algorithm, which is an acronym for hash-based message authentication code (HMAC) using hash function SHA-256. HMAC is a specific type of message authentication code involving a cryptographic hash function and a secret cryptographic key. However, any type of signing algorithm can be used in a JWT. In some examples, the signing algorithm protects the payload of the JWT against tampering.

The value of the "token" at the end of the example JWT is the value returned by "jwt.encode( )". For example, the byte string at the end of the JWT is the final token provided to the resource owner 104.

In FIG. 2, the example character counter 204 counts the characters in the scope assignment to determine whether generating an alias for the scope assignment would reduce the size of the scope assignment in the payload of the access token. A character is a unit of information that represents a letter, number, or symbol in a digital text. The number of bits or bytes that a character takes up can vary depending on the specific encoding used. For example, the ASCII encoding system uses 1 byte (8 bits) per character, while the UTF-8 encoding system uses between 1 and 4 bytes per character. In some examples, the character counter 204 parses the scope assignment to determine a total number of characters. In some examples, the character counter 204 compares the total number of characters to a threshold number of characters to determine whether generating an alias for the scope assignment would reduce the size of the scope assignment. In some examples, the threshold number of characters is defined based on client application 106 (FIG. 1). For example, if the client application 106 has a specific limitation for a header size, the client application 106 can set the threshold number of characters based on that limitation. In this example, the threshold number of characters may be set to nine (9) characters, where eight (8) characters is the limit. In such an example, the character counter 204 compares the total number of characters to nine (9). If the total number of characters are equal to or greater than (e.g., satisfies) nine (9) characters, then the example character counter 204 notifies the alias scope generation circuitry 206 to generate an alias for the scope assignment. If the total number of characters is less than nine (9) characters, then the example character counter 204 notifies the assignment circuitry 210 (FIG. 1) to assign the original scope assignment to the user credentials (e.g., to the user identity).

In some examples, the character counter 204 includes means for counting characters in a scope assignment. For example, the means for counting characters in a scope assignment may be implemented by character counter circuitry 204. In some examples, the character counter circuitry 204 may be instantiated by programmable circuitry such as the example programmable circuitry 812 of FIG. 8. For instance, the character counter circuitry 204 may be instantiated by the example microprocessor 900 of FIG. 9 executing machine executable instructions such as those implemented by at least blocks 602 and 604 of FIG. 6. In some examples, the character counter circuitry 204 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the character counter circuitry 204 may be instantiated by any other combination of hardware, software, and/or firmware. For example, the character counter circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In FIG. 2, the example alias scope generation circuitry 206 generates a random alias for a scope assignment. The example alias scope generation circuitry 206 obtains the scope assignment and combines the scopes (e.g., appends the scopes). The combined scopes may then be used to create a hexadecimal value, a GUID value, etc. In some examples, the alias scope generation circuitry 206 creates a hexadecimal value, not used before, having less than the threshold number of characters. For example, if the threshold number of characters is nine (9), the alias scope generation circuitry 206 may generate a hexadecimal value having eight (8) digits and, thus, eight (8) characters, for a 32 bit value. Additionally and/or alternatively, the alias scope generation circuitry 206 creates a GUID value, not used before, having less than the threshold number of characters.

In some examples, when the alias scope generation circuitry 206 uses hexadecimal values for aliases, the alias scope generation circuitry 206 iterates through hexadecimal values per new scope assignments. For example, the alias scope generation circuitry 206 obtains a first-in-time scope assignment (e.g., the first scope assignment received having more than a threshold number of characters) and generates an alias having hexadecimal value equal to 0000 0001. Then, the alias scope generation circuitry 206 obtains a second-in-time scope assignment (e.g., the second scope assignment, having a combination of scopes different from the first-in-time scope assignment, received having more than a threshold number of characters) and generates an alias having hexadecimal value equal to 0000 0010. In some examples, the alias scope generation circuitry 206 obtains a tenth-in-time scope assignment (e.g., the tenth scope assignment, having a combination of scopes different from the first nine scope assignments, received having more than a threshold number of characters) and generates an alias having hexadecimal value equal to 0000 000A.

In some examples, the alias scope generation circuitry 206 increments the hexadecimal values per newly received scope assignments by implementing an incrementing algorithm. In some examples, the alias scope generation circuitry 206 does not increment the hexadecimal values and, instead, generates a random hexadecimal value per newly received scope assignments. In this example, the alias scope generation circuitry 206 checks the example datastore 212 after generating the random hexadecimal value to determine whether that hexadecimal value is already assigned as an alias. Similarly, when the example alias scope generation circuitry 206 generates GUIDs as aliases, the example alias scope generation circuitry 206 checks the example datastore 212 to determine whether that random GUID value is already assigned as an alias. If the example alias scope generation circuitry 206 determines the randomly generated value (e.g., hexadecimal, GUID, or other unique value) is assigned as an alias, the example alias scope generation circuitry 206 generates a new and different value having the threshold number of characters.

The example alias scope generation circuitry 206 provides the alias to the example alias mapping circuitry 208 to map the alias to the scope assignment. In this manner, the example alias scope generation circuitry 206 reduces the character size of the scope utilized in an access token and, thus, reduces a size of the access token. Additionally, the example alias scope generation circuitry 206 obfuscates the scopes in the access token. For example, the access token includes a random value (e.g., hexadecimal, GUID, etc.) rather than the actual scope assignment (e.g., ResourceA.scope.read, ResourceA.scope.write, etc.). Therefore, the example alias scope generation circuitry 206 protects the resources and resource owner 104 from malicious actors attempting to gain insight into the permissions the resource owner 104 has.

In some examples, the alias scope generation circuitry 206 includes means for generating an alias. For example, the means for generating an alias may be implemented by alias scope generation circuitry 206. In some examples, the alias scope generation circuitry 206 may be instantiated by programmable circuitry such as the example programmable circuitry 812 of FIG. 8. For instance, the alias scope generation circuitry 206 may be instantiated by the example microprocessor 900 of FIG. 9 executing machine executable instructions such as those implemented by at least block 608 of FIG. 6. In some examples, the alias scope generation circuitry 206 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the alias scope generation circuitry 206 may be instantiated by any other combination of hardware, software, and/or firmware. For example, the alias scope generation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In FIG. 2, the example alias mapping circuitry 208 maps an alias to a scope assignment. For example, the alias mapping circuitry 208 generates a lookup table and associates the alias to the scope assignment. In such an example, a lookup table represents a one-to-one mapping of the alias to the scope assignment. For example, a one-to-one mapping could be represented as "alias1→scope1, scope2, scope3", "alias2→scopeA, scopeB, scopeC", "alias3→scope100, scope300", etc. In some examples, the alias mapping circuitry 208 generates a hash table using hash function that transforms a key value to a specific index in a table, where the key is unique to the alias and/or is the alias. In such an example, the alias mapping circuitry 208 uses that index to obtain and/or identify the scope assignment. The example alias mapping circuitry 208 ensures that each time an alias is generated, the corresponding scope assignment can be identified. The alias mapping generated by the example alias mapping circuitry 208 enables the client application 106 to "de-alias" an alias from an access token and provide the resource owner 104 with the appropriate permissions to the resource(s). For example, when the client application 106 obtains a request from a resource owner 104 to validate an access token, the client application 106 validates the request and then de-aliases the alias to uncover the original scope assignment and provide the resource owner 104 with accesses to the resource.

In some examples, the alias mapping circuitry 208 includes means for mapping. For example, the means for mapping may be implemented by alias mapping circuitry 208. In some examples, the alias mapping circuitry 208 may be instantiated by programmable circuitry such as the example programmable circuitry 812 of FIG. 8. For instance, the alias mapping circuitry 208 may be instantiated by the example microprocessor 900 of FIG. 9 executing machine executable instructions such as those implemented by at least blocks 608 and 610 of FIG. 6. In some examples, the alias mapping circuitry 208 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the alias mapping circuitry 208 may be instantiated by any other combination of hardware, software, and/or firmware. For example, the alias mapping circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In FIG. 2, the example assignment circuitry 210 assigns aliases and/or scope assignments to user identities. For example, the assignment circuitry 210 associates a combination of scopes to user credentials provided by the resource owner 104. In some examples, the assignment circuitry 210 associates an alias to the user credentials. In this manner, the example token generation circuitry 120 (FIG. 2) can generate an access token using the user credentials and any permissions information associated with the user credentials. In some examples, the assignment circuitry 210 provides the token generator circuitry 120 with user credentials and permissions information (e.g., original scope assignment, alias, etc.). In some examples, permissions information for a resource owner 104 may change over time. For example, new scopes may be assigned and/or requested by the resource owner 104. In such an example, the assignment circuitry 210 updates the identity (e.g., user credentials) of the resource owner 104 with the new permissions information (e.g., new alias, new scope assignment, etc.).

In some examples, the assignment circuitry 210 includes means for assigning permissions information to user credentials. For example, the means for assigning permissions information to user credentials may be implemented by assignment circuitry 210. In some examples, the assignment circuitry 210 may be instantiated by programmable circuitry such as the example programmable circuitry 812 of FIG. 8. For instance, the alias mapping circuitry 208 may be instantiated by the example microprocessor 900 of FIG. 9 executing machine executable instructions such as those implemented by at least blocks 512 and 514 of FIG. 5. In some examples, the assignment circuitry 210 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the assignment circuitry 210 may be instantiated by any other combination of hardware, software, and/or firmware. For example, the assignment circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In FIG. 2, the example alias generation circuitry 102 includes the example datastore 212 to store aliases 214, scope assignments 216, alias mapping information 218, and user identities 220. The user identities 220 stored in the example datastore 212 are indicative of an identity and permissions of a resource owner 104. The example datastore 212 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example datastore 212 may additionally or alternatively be implemented by one or more double data rate (DDR) memories, such as DDR, DDR2, DDR3, DDR4, mobile DDR (mDDR), etc. The example datastore 212 may additionally or alternatively be implemented by one or more mass storage devices such as hard disk drive(s), compact disk (CD) drive(s), digital versatile disk (DVD) drive(s), solid-state disk drive(s), etc. While in the illustrated example the datastore 212 is illustrated as a single datastore, the datastore 212 may be implemented by any number and/or type(s) of datastores. Furthermore, the data stored in the example datastore 212 may be in any data format such as, for example, binary data, comma delimited data, tab delimited data, structured query language (SQL) structures, etc.

In some examples, the alias generation circuitry 102 does not implement the example datastore 212 and, instead, stores aliases 214, scope assignments 216, alias mapping information 218, and user identities 220 in the example authentication database 124. For example, the alias scope generation circuitry 206 stores alias n 214 and scope assignment n 216 in the example authentication database 124, the alias mapping circuitry 208 stores alias mapping information 218 in the example authentication database 124, and the assignment circuitry 210 stores user identity n 220 in the example authentication database 124.

Figure 3:
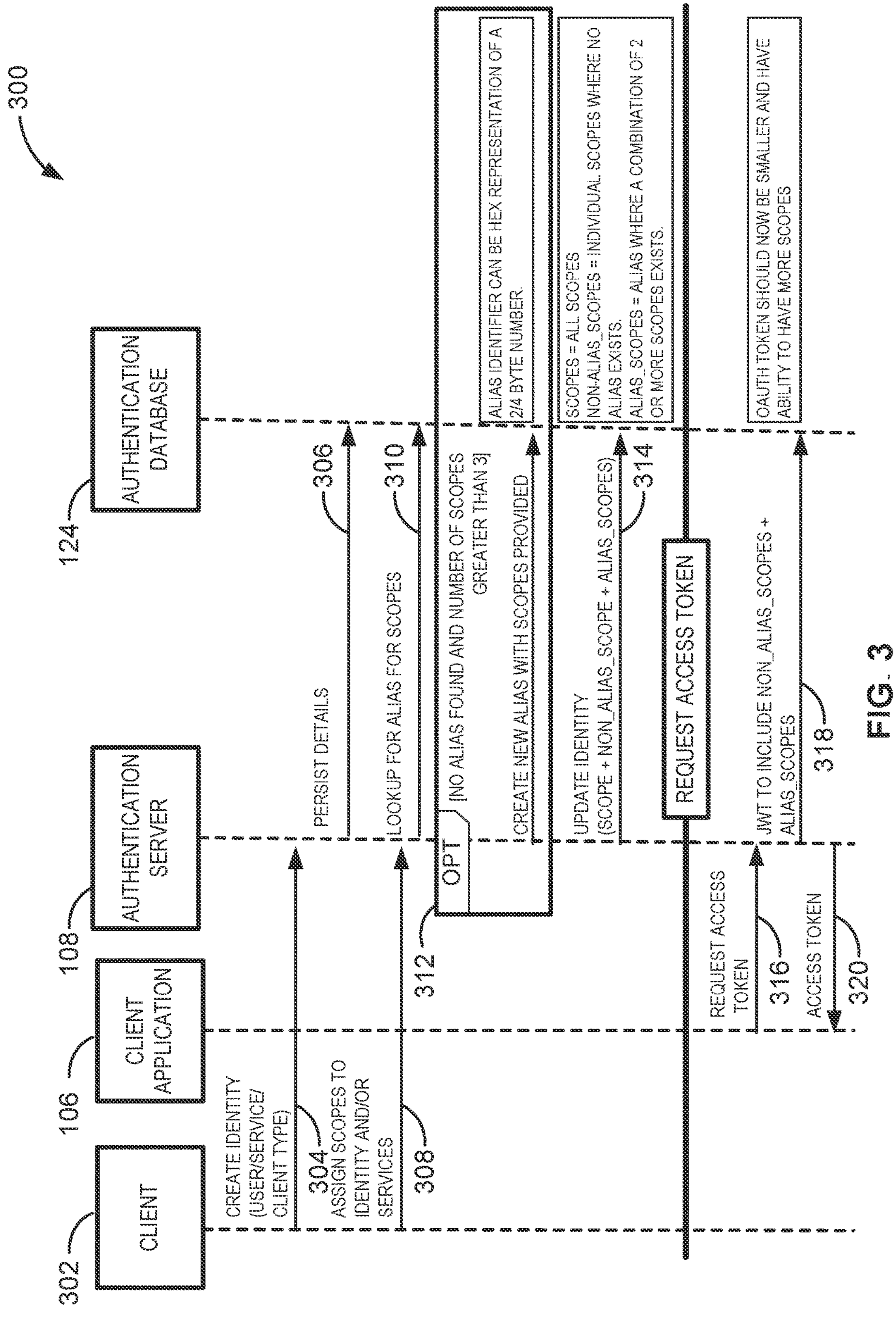
FIG. 3 is an example sequence illustrating an example sequence of requests that may be exchanged among an example authentication server, an example client, and an example authentication database.

FIG. 3 is an example sequence 300 illustrating an example sequence of requests that may be exchanged among the authentication server 108, an example client 302, and the example authentication database 124. The example sequence 300 begins at arrow 304 as the client 302 creates an identity for a resource owner (e.g., resource owner 104 of FIG. 1) to register the resource owner with the authentication server 108. The example client 302 (e.g., the entity operating the client application 106) registers the client application 106 with an authentication service associated with the authentication server 108. To do so, the client 302 provides client identity information (e.g., user credentials, service name, client type, and/or any other user association information) to the authentication server 108.

At arrow 306, the authentication server 108 stores (e.g., saves, persists, etc.) the client identity information (e.g., client type, the information associated with the client 302, information associated with the client application 106, etc.) in the authentication database 124.

At arrow 308, the example client 302 assigns scopes (e.g., permissions) to the client identity and corresponding service (e.g., client application 106). For example, the client 302 provides scope assignments to the authentication server 108 for the particular client identity.

At arrow 310, the example authentication server 108 looks up an alias for the scope assignment. For example, the alias lookup circuitry 202 of the alias generation circuitry 102 executes a matching algorithm in the authentication database 124 to identify an alias that corresponds to the scope assignment. In some examples, the alias lookup circuitry 202 may not execute the matching algorithm if the scope assignment includes less than a predefined number of scopes (e.g., three (3) scopes).

If the authentication database 124 does not return an alias for the scope assignment, the authentication server 108 executes arrow 312. At arrow 312, the authentication server 108 creates a new alias with the scopes provided in the scope assignment. For example, the character counter 204 is initiated to determine a number of characters in the scope assignment counts the characters in the scope assignment to determine whether generating an alias for the scope assignment would reduce the size of the scope assignment. Then, when it is determined that an alias would reduce the size of the scope assignment based on the total number of characters counted in the scope assignment, the alias scope generation circuitry 206 generates the alias. Then, the example alias mapping circuitry 208 maps the alias to the scope assignment.

At arrow 314, the authentication server 108 updates the client identity and stores the updated client identity in the authentication database 124. For example, the assignment circuitry 210 assigns scope information (e.g., scope(s) and/or an alias) to the user credentials. In some examples, when the authentication database 124 returns an alias after arrow 310, the assignment circuitry 210 assigns that alias to the client identity. In some examples, when the authentication server 108 and/or alias lookup circuitry 202 determines that an alias is not appropriate (e.g., because an alias would be greater in character size than the character size of the scope assignment), the assignment circuitry 210 assigns the scope assignment to the client identity, without including an alias. In some examples, when the authentication server 108 and/or the alias scope generation circuitry 206 generates a new alias at arrow 312, the assignment circuitry 210 assigns the new alias to the client identity. The example authentication server 108 stores the client identity with assigned alias and/or scopes in the example authentication database 124.

At arrow 316, the client application 106 requests an access token from the authentication server 108 using the client credentials. In some examples, the client application 106 requests an access token in response to an HTTP request from the resource owner 104 requesting access to the online resource 112. For example, the client application 106 may need an access token to permit the resource owner 104 access to the online resource 112.

At arrow 318, the authentication server 108 verifies that the client credentials provided by the client application 106 match the client credentials that the authentication server 108 assigned to the client 302 (arrow 306) and lookup scope information related to the verified client credentials. In other words, the authentication server 108 validates the client credentials and requests scope information (e.g., aliases and/or scope assignments). In this example, the client credentials that the authentication server 108 issued to the client 302 are stored in the authentication database 124.

At arrow 320, the example authentication server 108 generates an access token. For example, the token generator circuitry 120 (FIG. 1) generates an access token when the authentication server 108 determines that the client credentials are valid. Further, the token generator circuitry 120 generates the access token to include the alias and/or scope assignment. When the user credentials are associated with a scope assignment mapped to an alias, the token generator circuitry 120 generates the access token to include the alias and, thus, the access token is smaller in size relative to generating an access token without using an alias.

Figure 4:
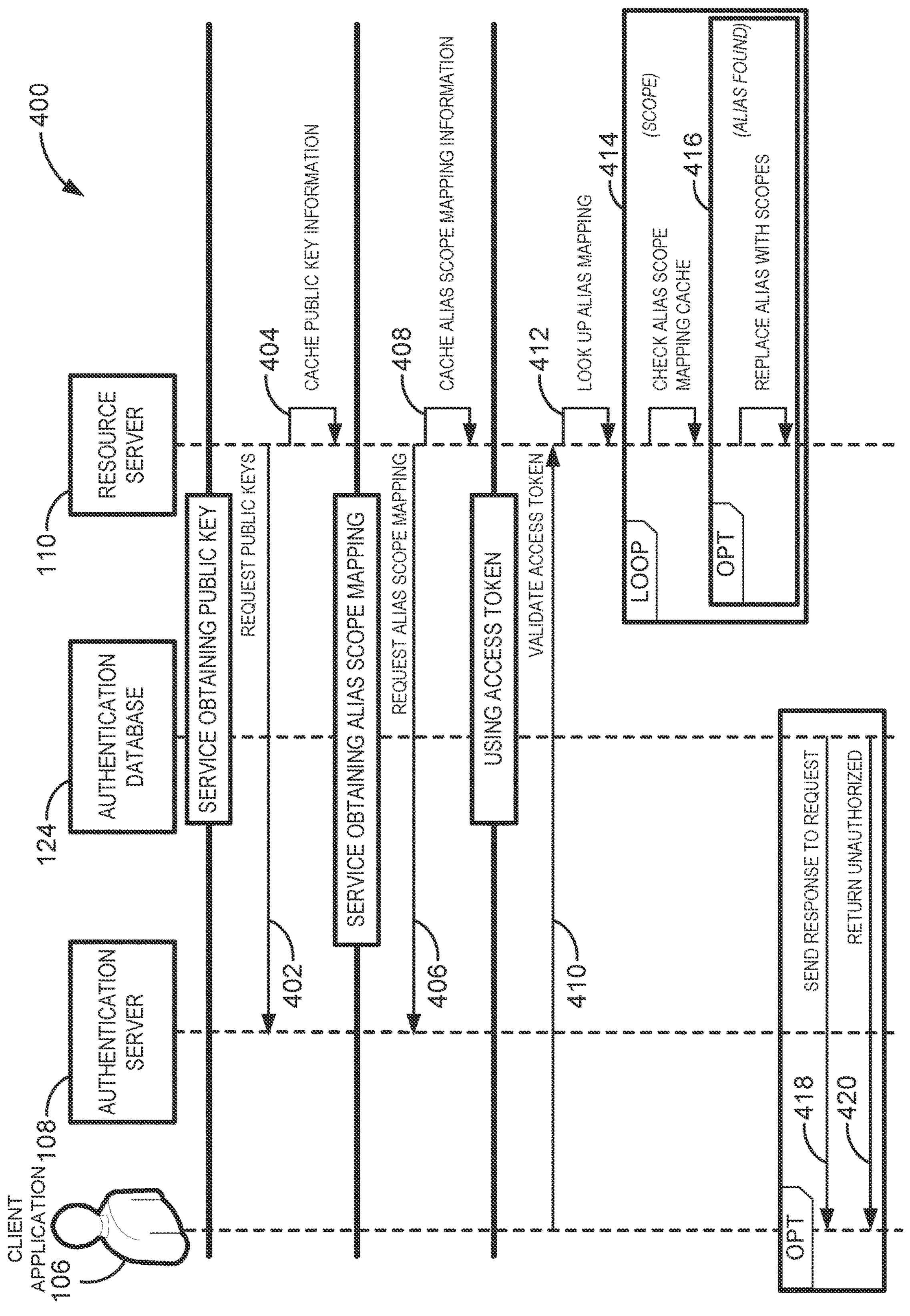
FIG. 4 is an example sequence illustrating an example sequence of requests that may be exchanged among an example client application, an example authentication server, and an example resource server.

FIG. 4 is an example sequence 400 illustrating an example sequence of requests that may be exchanged among the client application 106, the authentication server 108, and the resource server 110. The example sequence 400 is different from the example sequence 300 in that the resource server 110 makes requests to the authentication server 108 for public keys, different than conventional requests to the authentication server 108 for public keys.

In this example, the resource server 110 is a generic service different from the authentication server 108. For example, the resource server 110 is a third party server (e.g., Google™, Facebook®, etc.). The resource server 110 has to validate access tokens obtained from a client application (e.g., client application 106). In some examples, the authentication server 108 includes and/or contains a signing key or secret key that validates the access token. For example, as described above in connection with the JSON web token (JWT) for user ID 123, the JWT includes a secret key which is only known by the authentication server 108 (because it is more beneficial to have the signing key safely stored in the authentication service, and only used to generate keys). When only the authentication server has the secret key, other services such, as the resource server 110, can verify the access token without having access to this secret key. For example, the resource server 110 and the authentication server 108 utilize public-key cryptography. Public-key cryptography is based on encryption keys that have two components: a public key and a private key, where the public key component can be shared freely. One workflow for public-key cryptography is message signing. Message signing includes the authentication server 108 signing a message (e.g., signing the access token), using a private signing key, to certify that the message came from the authentication server 108. Any interested third party server (e.g., the resource server 110) can verify the message (e.g., the access token) by using a public key generated by the authentication server 108 to confirm that the signature is valid. Therefore, the resource server 110 has to periodically request public keys from the authentication server 108.

The example sequence 400 begins at arrow 402 as the example resource server 110 requests public key(s) from the example authentication server 108. The example authentication server 108 generates public keys for the example resource server 110 to use, and the example authentication server 108 generates public keys for the resource owner 104 to use.

At arrow 404, the example resource server 110 caches the public key(s) received from the example authentication server 108. For example, the resource server 110 stores the public keys in a local datastore, local memory, etc.

At arrow 406, the example resource server 110 requests alias scope mapping information from the example authentication server 108. For example, when alias scope mapping information is utilized by the authentication server 108, the authentication server 108 notifies and/or causes the resource server 110 to retrieve alias scope mapping information. In some examples, the authentication server 108 may respond to a request for public key(s) with the public key(s) plus an instruction to retrieve alias scope mapping information. For example, the permissions controller circuitry 122 may generate an instruction to cause the resource server 110 to request alias scope mapping information. Additionally and/or alternatively, the example alias generation circuitry 102 may generate an instruction to cause the resource server 110 to request alias scope mapping information. Additionally and/or alternatively, the example token generator circuitry 120 may generate an instruction to cause the resource server 110 to request alias scope mapping information. In some examples, the instructions causes the resource server 110 to request a number of alias scopes issued within a given time period. For example, the resource server 110 may request alias scope mapping information issued during a lifespan for an access token. The example token generator circuitry 120 assigns lifespans (e.g., 5 minutes, 10 minutes, 30 minutes, an hour, etc.) to access tokens. In some examples, a new access token may include a new alias scope not yet stored (e.g., cached) by the resource server 110. Therefore, the example resource server 110 requests only alias scopes issued within a given time period, the time period associated with the lifespan of access tokens.

At arrow 408, the example resource server 110 caches the alias scope mapping information. For example, the resource server 110 stores the alias scope mapping information in a local datastore, local memory, etc.

At arrow 410, the example client application 106 requests that the example resource server 110 validate an access token. For example, the client application 106 transmits the access token (e.g., Oauth token) in response to a request (e.g., HTTP request) from the resource owner 104 to access the online resource 112. The request to validate the access token includes the public key information.

At arrow 412, the example resource server 110 uses the alias scope mapping information to look up scopes that are included in the access token (e.g., Oauth token). For example, if the client application 106 provided an access token including an alias, the resource server 110 has to de-alias the alias in order to obtain the scopes that correspond to the client ID.

At arrow 414, the example resource server 110 checks the cache for alias scope mapping information. In some examples, the resource server 110 checks a look up table (stored in the cache as alias scope mapping information) using the scope(s) in the access token.

At arrow 416, the example resource server 110 replaces the alias with the scopes if the resource server 110 has successfully identified the scope(s) mapped to the alias.

At arrow 418, the example resource server 110 may transmit a message indicating that the request and the end user who requested the online resource 112 are authorized. For example, the resource server 110 may determine (1) that the access token is valid and (2) that the scope(s) corresponding to the alias have been identified. In this manner, the end user (e.g., the resource owner 104) obtains specific permissions (e.g., pre-assigned scopes) to the online resource 112.

In some examples, if the resource server 110 does not identify a scope mapped to the respective alias and/or does not validate the access token, the resource server 110 may return a request to the client application 106 as "unauthorized." For example, at arrow 420, the resource server 110 notifies the client application 106 that the resource owner 104 cannot access the online resource 112. In some examples, the resource server 110 transmits a message to the client application 106, the message indicating that the request and the end user who requested the online resource 112 are unauthorized. However, any other type of response message that does not provide access to the online resource 112 may additionally or alternatively be used. In this manner, the end user may not have access to the online resource 112.

While an example manner of implementing the alias generation circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example alias lookup circuitry 202, the example character counter 204, the example alias scope generation circuitry 206, the example alias mapping circuitry 208, the example assignment circuitry 210, and/or, more generally, the example alias generation circuitry 102 of FIG. 2, may be implemented by hardware alone or by hardware in combination with software and/or firmware. Thus, for example, any of the example alias lookup circuitry 202, the example character counter 204, the example alias scope generation circuitry 206, the example alias mapping circuitry 208, the example assignment circuitry 210, and/or, more generally, the example alias generation circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example alias generation circuitry 102 of FIG. 2 may include one or more elements, processes, and/or devices in addition to, or instead of, those illustrated in FIG. 2, and/or may include more than one of any or all of the illustrated elements, processes and devices.

Figure 5:
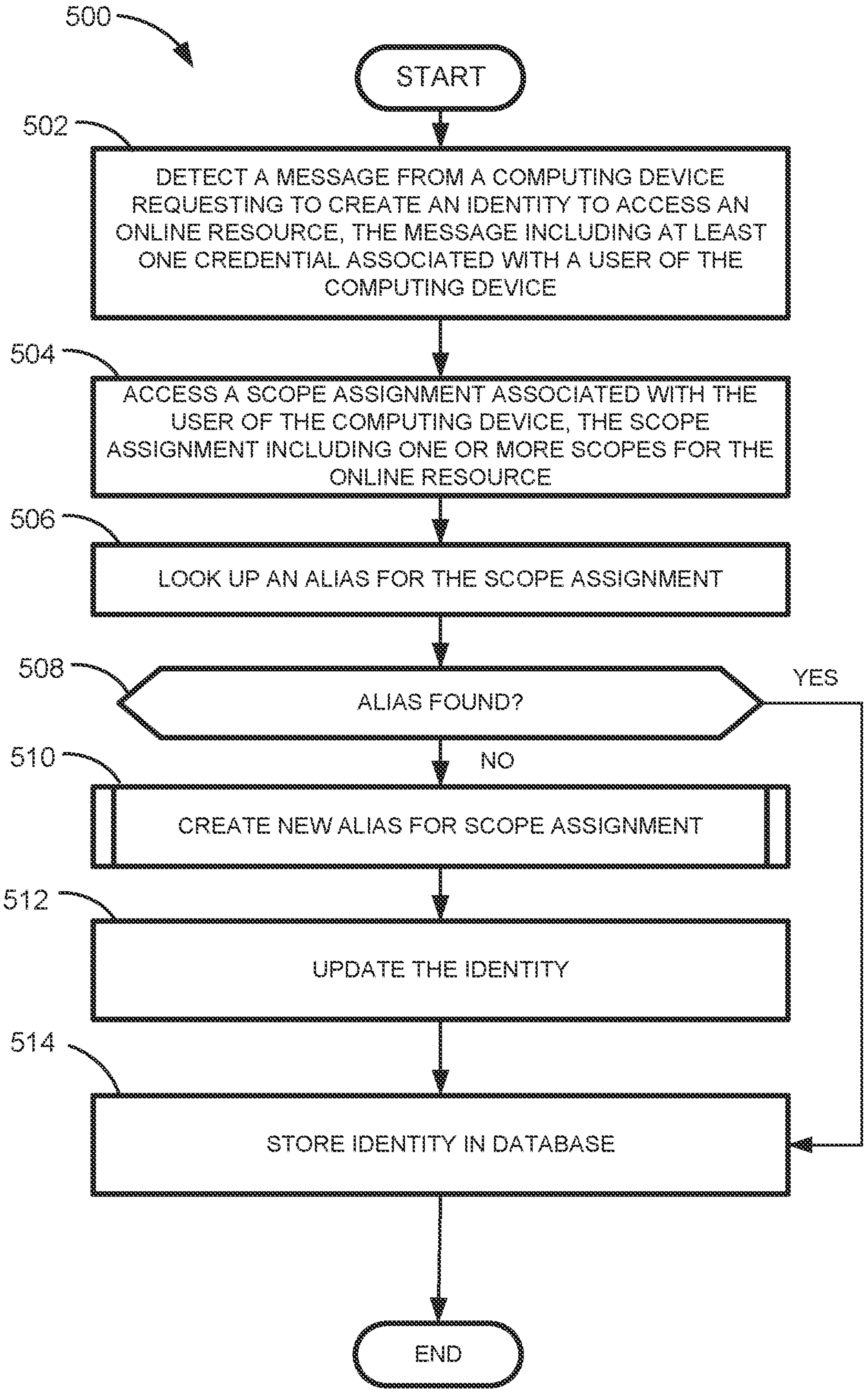
FIG. 5 is a flowchart representative of example machine readable instructions and/or example operations that may be executed, instantiated, and/or performed by example programmable circuitry to implement the example alias generation circuitry of FIGS. 1 and 2.
Figure 6:
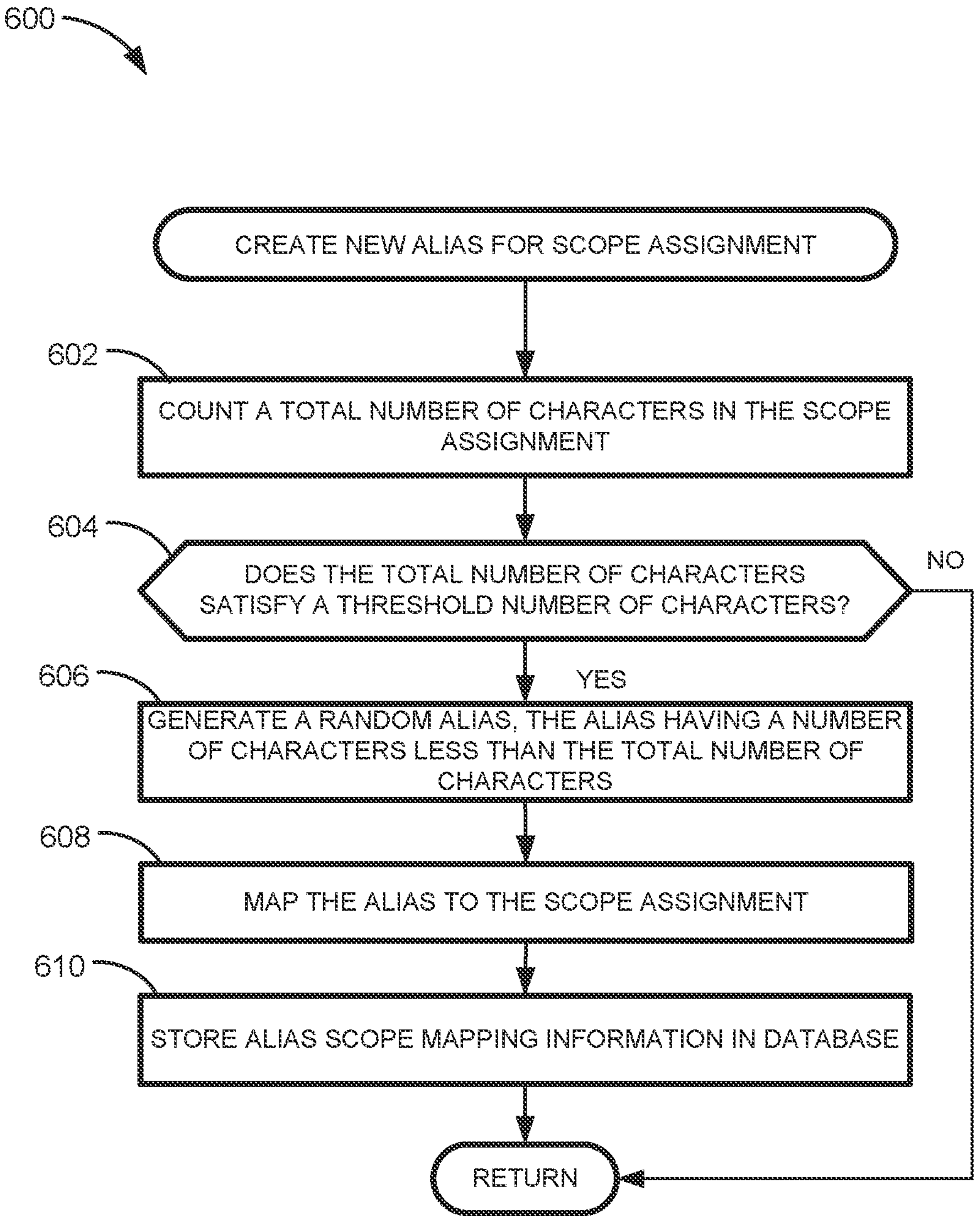
FIG. 6 is a flowchart representative of example machine readable instructions and/or example operations that may be executed, instantiated, and/or performed by example programmable circuitry to implement the example alias generation circuitry of FIGS. 1 and 2.
Figure 7:
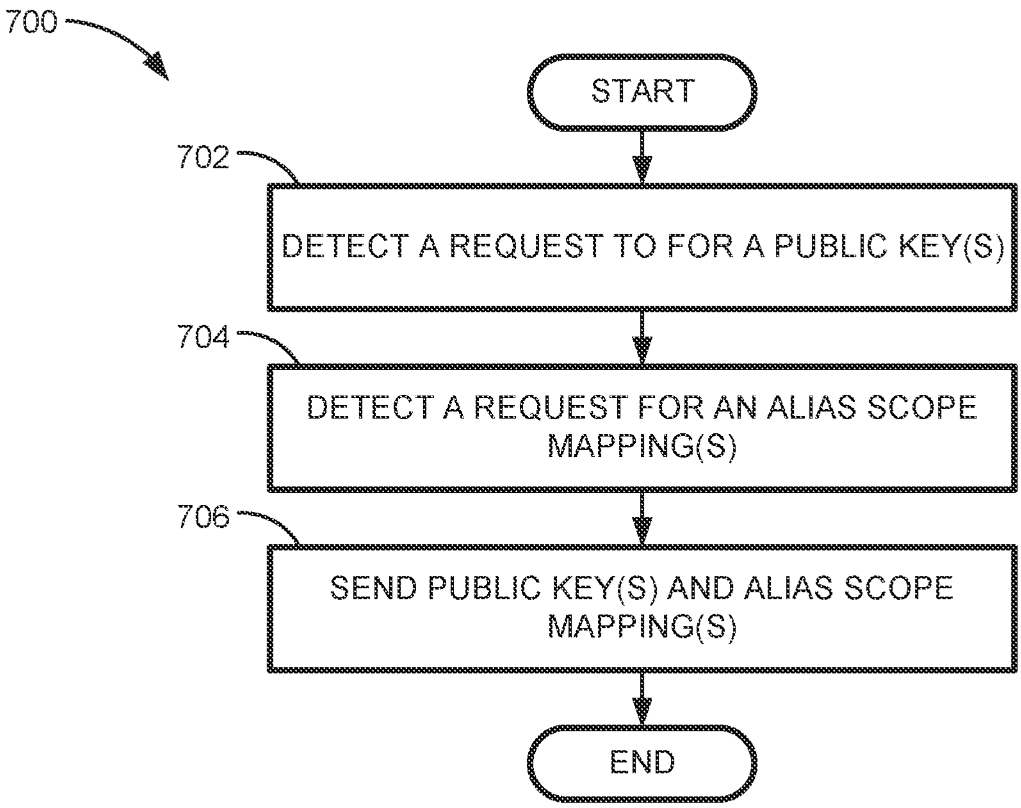
FIG. 7 is a flowchart representative of example machine readable instructions and/or example operations that may be executed, instantiated, and/or performed by example programmable circuitry to implement the example authentication server of FIG. 1.

Flowcharts representative of example machine readable instructions, which may be executed by programmable circuitry to implement and/or instantiate the alias generation circuitry 102 of FIG. 2 and/or representative of example operations which may be performed by programmable circuitry to implement and/or instantiate the alias generation circuitry 102 of FIG. 2, are shown in FIGS. 5-7. The machine readable instructions may be one or more executable programs or portion(s) of one or more executable programs for execution by programmable circuitry such as the programmable circuitry 812 shown in the example programmable circuitry platform 800 discussed below in connection with FIG. 8 and/or may be one or more function (s) or portion(s) of functions to be performed by the example programmable circuitry (e.g., an FPGA) discussed below in connection with FIGS. 9 and/or 10. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 5-7, many other methods of implementing the example alias generation circuitry 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed, instantiated, and/or performed by programmable circuitry to create an identity for a resource owner using an alias for one or more scope assignments. The example machine-readable instructions and/or the example operations 500 of FIG. 5 begin at block 502, at which the example authentication server 108 (FIG. 1) detects a message from a computing device requesting to create an identity to access an online resource, the message including at least one user credential associated with a user of the computing device. For example, the end user communications circuitry 114 (FIG. 1) may receive an HTTP request from a computing device requesting access to the online resource 112 (FIG. 1) and transmits the request to the authentication server 108. In some examples, the resource owner 104 (FIG. 1) requests access to the online resource 112 via the example computing device. In some examples, the end user communications circuitry 114 accesses at least one credential (e.g., username and/or password) associated with a user (e.g., the resource owner 104) of the computing device. In some examples, the end user communications circuitry 114 may prompt the user to enter additional user identifying information and scope assignments.

At block 504, the example authentication server 108 accesses a scope assignment associated with the user of the computing device, the scope assignment including one or more scopes for the online resource 112. For example, the alias generation circuitry 102 (FIG. 1) accesses permissions, referred to as scopes, that were requested by the user (e.g., the resource owner 104). In some examples, the scope assignment includes reading, writing, creating, deleting, and/or updating the online resource 112. The scope assignment may be written in a particular syntax and/or may be in human readable language and subsequently transformed into a particular syntax by the token generator circuitry 120 (FIG. 1). The scope assignment may include a plurality of scopes.

At block 506, the example authentication server 108 looks up an alias for the scope assignment. For example, the alias generation circuitry 102 (FIG. 1) and/or the alias lookup circuitry 202 (FIG. 2) uses the scope assignment to determine whether an alias exists for the combination of scopes, if applicable. For example, if the scope assignment does not include a threshold number of scopes (e.g., three or more scopes, four or more scopes, etc.), the alias lookup circuitry 202 does not look up an alias because one would not exist. An alias is supposed to reduce the size of the scopes in an access token. If the scope is already small in character size, then there is a likelihood that an alias would be larger in character size. Scope assignments having only one or two scopes may be small in character size and, thus, smaller than an alias.

At block 508, the example authentication server 108 determines whether an alias has been found. For example, the alias generation circuitry 102 and/or the alias lookup circuitry 202 informs the authentication server 108 whether a match has been found.

If the example authentication server 108 determines that an alias has not been found (block 508 returns a value NO), the example authentication server 108 creates a new alias for the scope assignment (block 510). For example, the alias generation circuitry 102 and/or the alias scope generation circuitry 206 creates an alias, not yet used, for the scope assignment as described in detail in connection with FIG. 6.

At block 512, the example authentication server 108 updates the identity with the new alias. For example, the alias generation circuitry 102 and/or the assignment circuitry 210 (FIG. 2) associates a combination of scopes, an alias representing a scope(s), one scope, etc., to user credentials provided by the resource owner 104.

At block 514, the example authentication server 108 stores the identity in the authentication database 124 (FIG. 1). For example, the alias generation circuitry 102 and/or the assignment circuitry 210 (FIG. 2) stores the updated identity of the resource owner 104 in the authentication database 124 for use by the token generator circuitry 120 when generating access tokens.

In some examples, when the authentication server 108 determines that an alias has been found (block 508 returns a value YES), the example authentication server 108 stores the identity in the authentication database 124 (block 514). For example, when the authentication server 108 receives the request to create an identity to access an online resource 112, the authentication server 108 uses the identifying information (e.g., user credentials) of the resource owner 104 and the scope assignment and/or alias to create the identity and store it in the authentication database 124.

The example operations 500 end when the identity has been stored in the example authentication database 124. The example operations 500 may be repeated when the example authentication server 108 receives a request, via a message, to create a new identity for a resource owner.

FIG. 6 is a flowchart representative of example machine readable instructions and/or example operations that may be executed, instantiated, and/or performed by programmable circuitry to implement the alias generation circuitry 102, described above in connection with block 510 of FIG. 5. The example machine readable instructions and/or the operations of FIG. 6 begin at block 600, at which the example character counter 204 counts a total number of characters in the scope assignment. For example, the character counter 204 parses the scope assignment to determine a total number of characters, where a character is a unit of information that represents a letter, number, or symbol in a digital text.

At block 604, the example character counter 204 determines whether the total number of characters satisfies a threshold number of characters. For example, the character counter 204 compares the total number of characters to a threshold number of characters to determine whether generating an alias for the scope assignment would reduce the size of the scope assignment.

If the example character counter 204 determines that the total number of characters does not satisfy the threshold number of characters (block 604 returns a value NO), then the example operations 600 end, and control is returned to block 512 of FIG. 5, where the example assignment circuitry 210 updates the identity. However, in this example, the example assignment circuitry 210 updates the identity with the original scope assignment and does not update the identity with an alias. This is because an alias would be greater in character size than the original scope, which would defeat the purpose of having an alias associated with the scope assignment.

If the example character counter 204 determines that the total number of characters satisfies the threshold number of characters (block 604 returns a value YES), the example alias scope generation circuitry 206 generates a random alias, the alias having a number of characters less than the total number of characters in the scope assignment (block 606). For example, the alias scope generation circuitry 206 creates a hexadecimal value, not used before, having the threshold number of characters. Additionally and/or alternatively, the alias scope generation circuitry 206 creates a GUID value, not used before, having the less than threshold number of characters.

At block 608, the example alias mapping circuitry 208 maps the alias to the scope assignment. For example, the alias mapping circuitry 208 generates mapping information (e.g., a lookup table, a hash table, and/or other types of mapping information) that enables a third party, such as the resource server 110, to "de-alias" the alias. De-aliasing the alias refers to the process of converting the alias back to the original scope assignment. In some examples, de-aliasing is necessary in order for the third party (e.g., resource server 110) to give the user (e.g., the resource owner 104) appropriate permissions to the requested resource (e.g., online resource 112). For example, a third party server, when authenticating and/or validating an access token, transmits the access token having the original scope assignments, to the device associated with the resource owner 104, via the client application 106. When the client application 106 obtains the access token, the resource owner 104 is authorized to access the online resource 112, where the authorization is limited to the scopes in the access token.

At block 610, the example alias mapping circuitry 208 stores the alias scope mapping information in the example authentication database 124. In some examples, the alias mapping circuitry 208 stores (e.g., caches) the alias scope mapping information in the datastore 212 (FIG. 2). In this example, the datastore 212 is accessible by the alias generation circuitry 102, the token generator circuitry 120, and/or the permissions controller circuitry 122. Therefore, any one of the example alias generation circuitry 102, the example token generator circuitry 120, and/or the example permissions controller circuitry 122 can provide a third party with the alias scope mapping information upon request.

The example operations 600 end when the alias scope mapping information is stored (e.g., cached) and control returns to block 512 of FIG. 5, where the example assignment circuitry 210 updates the identity.

FIG. 7 is a flowchart representative of example machine readable instructions and/or example operations 700 that may be executed, instantiated, and/or performed by programmable circuitry to automatically provide alias scope mapping information to a third party server in response to a request for public key(s). The example machine-readable instructions and/or the example operations 700 of FIG. 7 begin at block 702, at which the example authentication server 108 (FIG. 1) detects a message from the example resource server 110 for public key(s). For example, the authentication server 108 generates public keys for the example resource server 110 to use when validating access tokens.

At block 704, the example authentication server 108 detects a request for alias scope mapping information. In some examples, the resource server 110 simultaneously requests information related identifying a scope assignment when an alias has taken the scope assignment's place in the access token. In some examples, the resource server 110 may not request alias scope mapping information. For example, the resource server 110 may not be aware of the need for alias scope mapping information. In such an example, the authentication server 108 may notify the resource server 110 that alias scope mapping information is available for use in identifying scope assignments. In some examples, the authentication server 108 may instruct the resource server 110 to request alias scope mapping information. For example, the authentication server 108 may respond to the request for a public key with an instruction to request alias scope mapping information. Additionally and/or alternatively, the example authentication server 108 causes the resource server 110 to request alias scope mapping information.

At block 706, the example authentication server 108 sends the public key(s) and the alias scope mapping information to the example resource server 110. For example, the permissions controller circuitry 122 provides the public key(s) and alias scope mapping information to the resource server 110.

The example operations 700 end when the example authentication server 108 provides the example resource server 110 with one or more public keys and alias scope mapping information. In some examples, the alias scope mapping information is periodically and/or dynamically updated based on new aliases generated. In such an example, the authentication server 108 sends alias scope mapping information each time a request for public keys is detected and/or obtained. Therefore, the example resource server 110 includes an updated list of alias scope mapping information and can accurately de-alias the aliases.

Figure 8:
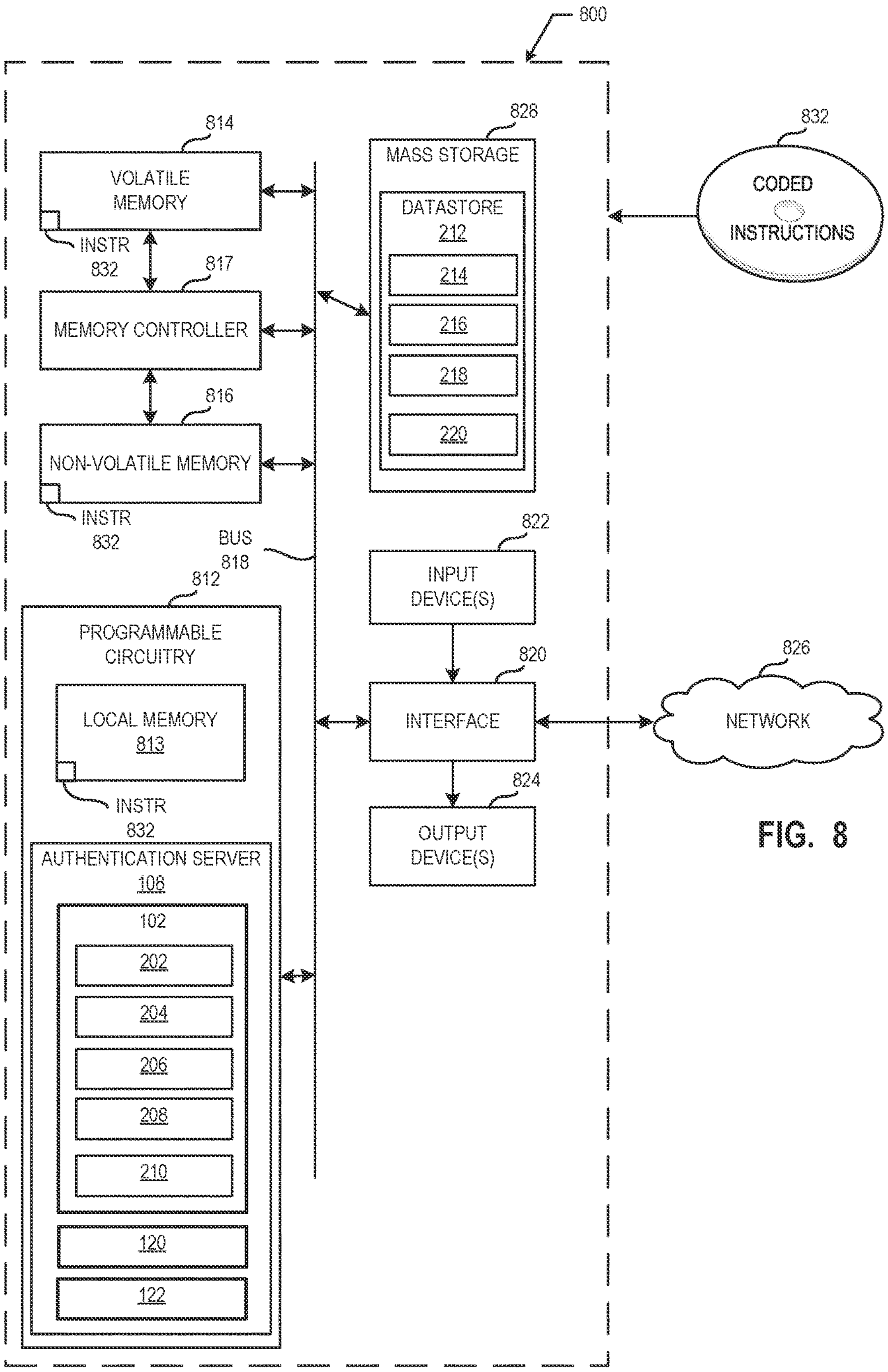
FIG. 8 is a block diagram of an example processing platform including programmable circuitry structured to execute, instantiate, and/or perform the example machine readable instructions and/or perform the example operations of FIGS. 5-7 to implement the authentication server of FIG. 1.

FIG. 8 is a block diagram of an example programmable circuitry platform 800 structured to execute and/or instantiate the example machine-readable instructions and/or the example operations of FIGS. 5-7 to implement the authentication server 108 of FIGS. 1 and 2. The programmable circuitry platform 800 can be, for example, a server, a personal computer, a workstation, a self-learning machine (e.g., a neural network), or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices. In this example, the programmable circuitry 812 implements the example alias generation circuitry 102, the example token generator circuitry 120, the example permissions controller circuitry 122, the example alias lookup circuitry 202, the example character counter 204, the example alias scope generation circuitry 206, the example alias mapping circuitry 208, and the example assignment circuitry 210.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, and/or an in-place switching (IPS) display, a touchscreen, etc.). The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs. In this example, the mass storage discs or devices 828 implement the example datastore 212 of FIG. 2.

The machine readable instructions 832, which may be implemented by the machine readable instructions of FIGS. 5-7, may be stored in the mass storage device 828, in the volatile memory 814, in the non-volatile memory 816, and/or on at least one non-transitory computer readable storage medium such as a CD or DVD which may be removable.

Figure 9:
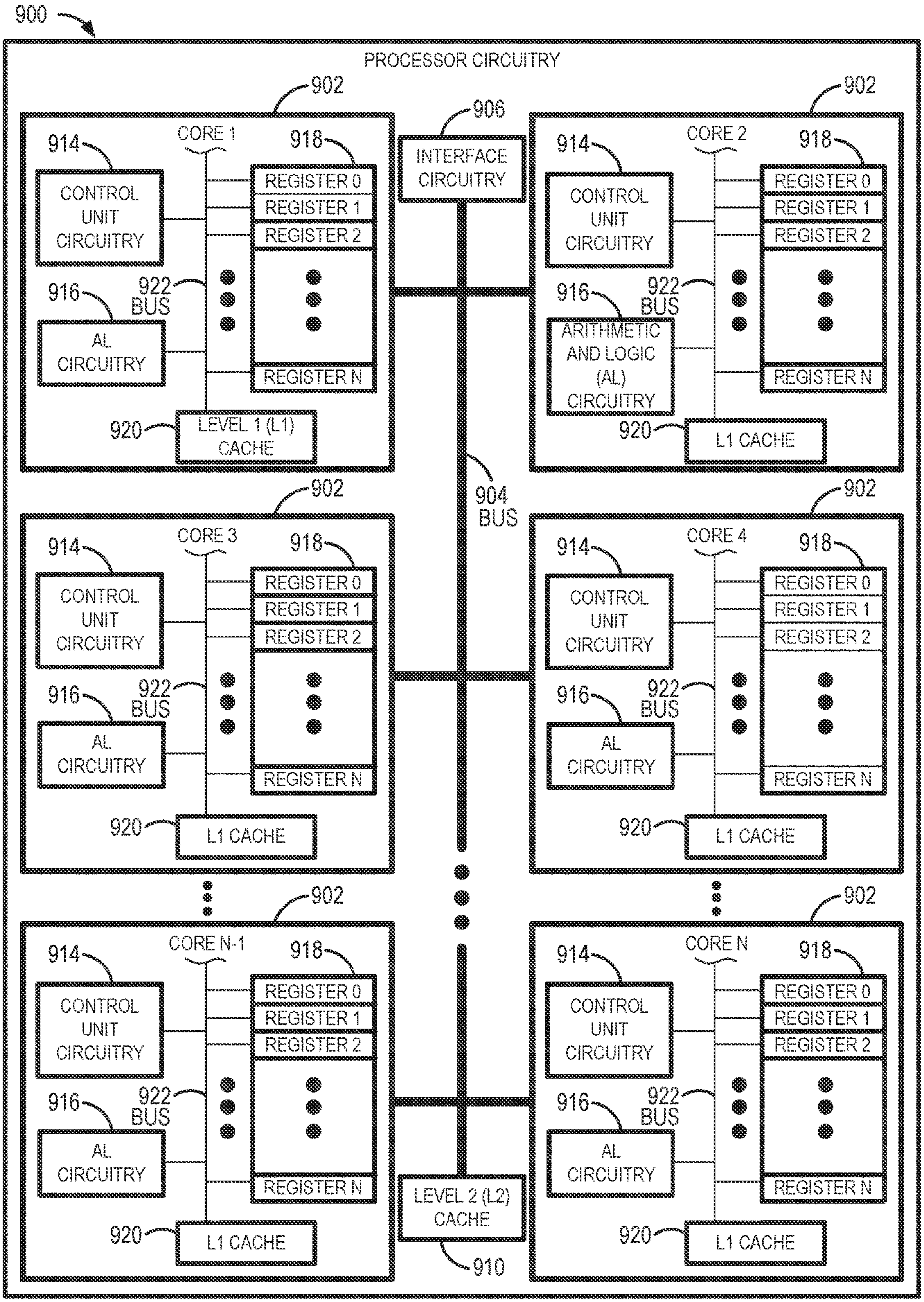
FIG. 9 is a block diagram of an example implementation of the programmable circuitry of FIG. 8.

FIG. 9 is a block diagram of an example implementation of the programmable circuitry 812 of FIG. 8. In this example, the programmable circuitry 812 of FIG. 8 is implemented by a microprocessor 900. For example, the microprocessor 900 may be a general-purpose microprocessor (e.g., general-purpose microprocessor circuitry). The microprocessor 900 executes some or all of the machine-readable instructions of the flowcharts of FIGS. 5-7 to effectively instantiate the circuitry of FIGS. 1 and 2 as logic circuits to perform operations corresponding to those machine readable instructions. In some such examples, the circuitry of FIG. 2 is instantiated by the hardware circuits of the microprocessor 900 in combination with the machine-readable instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 5-7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating-point operations. In yet other examples, the AL circuitry 916 may include first AL circuitry that performs integer-based operations and second AL circuitry that performs floating-point operations. In some examples, the AL circuitry 916 may be referred to as an Arithmetic Logic Unit (ALU).

The registers 918 are semiconductor-based structures to store data and/or instructions such as results of one or more of the operations performed by the AL circuitry 916 of the corresponding core 902. For example, the registers 918 may include vector register(s), SIMD register(s), general-purpose register(s), flag register(s), segment register(s), machine-specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure, such as by being distributed throughout the core 902 to shorten access time. The second bus 922 may be implemented by at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages.

The microprocessor 900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 900, in the same chip package as the microprocessor 900 and/or in one or more separate packages from the microprocessor 900.

Figure 10:
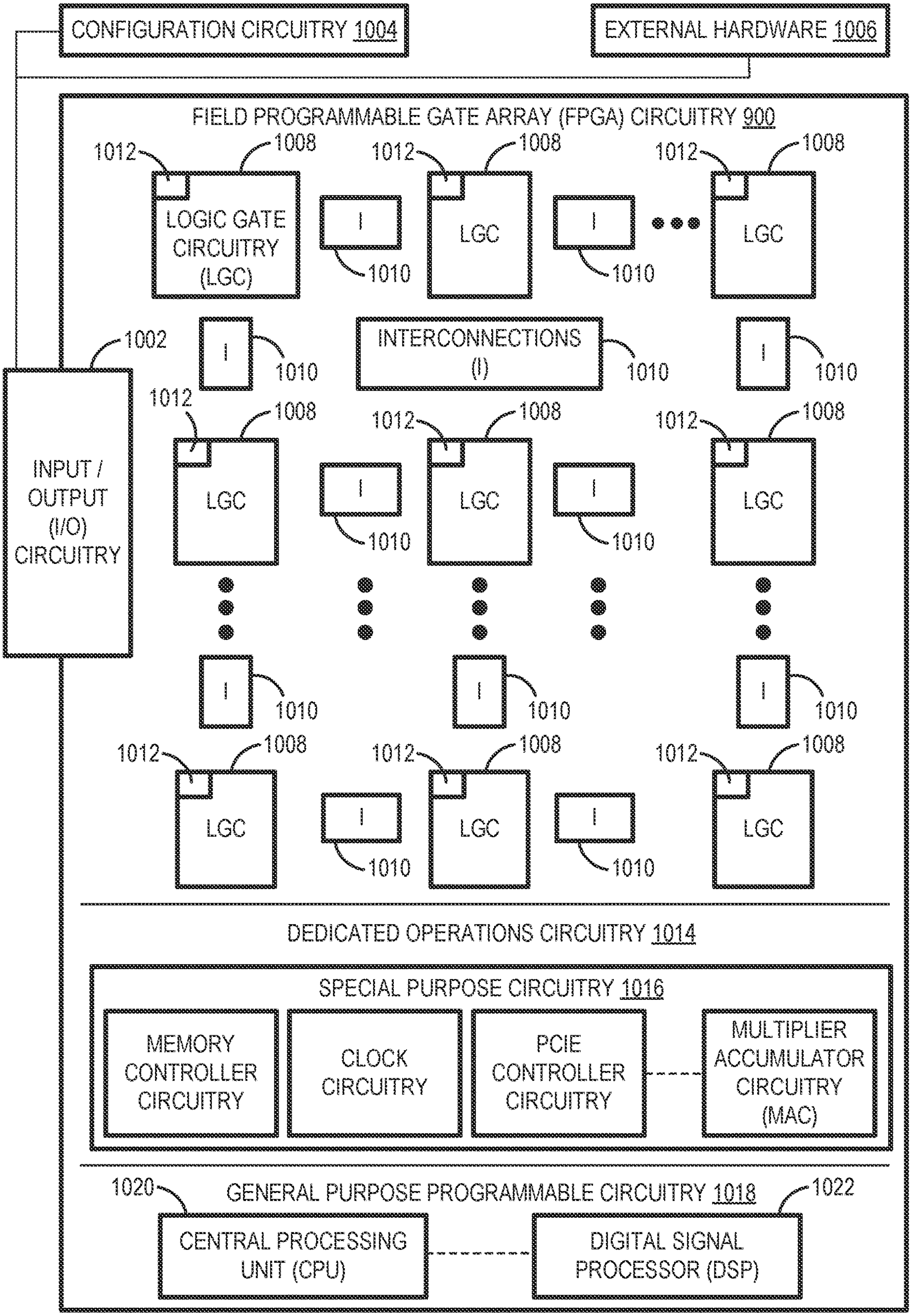
FIG. 10 is a block diagram of another example implementation of the programmable circuitry of FIG. 8.

FIG. 10 is a block diagram of another example implementation of the programmable circuitry 812 of FIG. 8. In this example, the programmable circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 900 of FIG. 9 described above (which is a general purpose device that may be programmed to execute some or all of the machine readable instructions represented by the flowchart(s) of FIGS. 5-7 but whose interconnections and logic circuitry are fixed once fabricated), the FPGA circuitry 1000 of the example of FIG. 10 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 5-7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 5-7. As such, the FPGA circuitry 1000 may be configured and/or structured to effectively instantiate some or all of the operations/functions corresponding to the machine readable instructions of the flowchart(s) of FIGS. 5-7 as dedicated logic circuits to perform the operations/functions corresponding to those software instructions in a dedicated manner analogous to an ASIC. Therefore, the FPGA circuitry 1000 may perform the operations/functions corresponding to the some or all of the machine readable instructions of FIGS. 5-7 faster than the general-purpose microprocessor can execute the same.

In the example of FIG. 10, the FPGA circuitry 1000 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain a binary file, which may be implemented by a bit stream, data, and/or machine-readable instructions, to configure the FPGA circuitry 1000, or portion(s) thereof. In some such examples, the configuration circuitry 1004 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1006 may be implemented by external hardware circuitry. For example, the external hardware 1006 may be implemented by the microprocessor 900 of FIG. 9.

The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations/functions that may correspond to at least some of the machine readable instructions of FIGS. 5-7 and/or other desired operations. The logic gate circuitry 1008 shown in FIG. 10 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations/functions. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example dedicated operations circuitry 1014. In this example, the dedicated operations circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the programmable circuitry 812 of FIG. 8, many other approaches are contemplated. For example, FPGA circuitry may include an on-board CPU, such as one or more of the example CPU 1020 of FIG. 9. Therefore, the programmable circuitry 812 of FIG. 8 may additionally be implemented by combining at least the example microprocessor 900 of FIG. 9 and the example FPGA circuitry 1000 of FIG. 10. In some such hybrid examples, one or more cores 902 of FIG. 9 may execute a first portion of the machine readable instructions represented by the flowchart(s) of FIGS. 5-7 to perform first operation(s)/function(s), the FPGA circuitry 1000 of FIG. 10 may be configured and/or structured to perform second operation(s)/function(s) corresponding to a second portion of the machine readable instructions represented by the flowcharts of FIGS. 5-7, and/or an ASIC may be configured and/or structured to perform third operation(s)/function(s) corresponding to a third portion of the machine readable instructions represented by the flowcharts of FIGS. 5-7.

It should be understood that some or all of the circuitry of FIG. 2 may, thus, be instantiated at the same or different times. For example, same and/or different portion(s) of the microprocessor 900 of FIG. 9 may be programmed to execute portion(s) of machine-readable instructions at the same and/or different times. In some examples, same and/or different portion(s) of the FPGA circuitry 1000 of FIG. 10 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 900 of FIG. 9 may execute machine readable instructions in one or more threads executing concurrently and/or in series. In some examples, the FPGA circuitry 1000 of FIG. 10 may be configured and/or structured to carry out operations/functions concurrently and/or in series. Moreover, in some examples, some or all of the circuitry of FIG. 2 may be implemented within one or more virtual machines and/or containers executing on the microprocessor 900 of FIG. 9.

In some examples, the programmable circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the programmable circuitry 812 of FIG. 8, which may be in one or more packages. For example, the XPU may include a CPU (e.g., the microprocessor 900 of FIG. 9, the CPU 1020 of FIG. 10, etc.) in one package, a DSP (e.g., the DSP 1022 of FIG. 10) in another package, a GPU in yet another package, and an FPGA (e.g., the FPGA circuitry 1000 of FIG. 10) in still yet another package.

Figure 11:
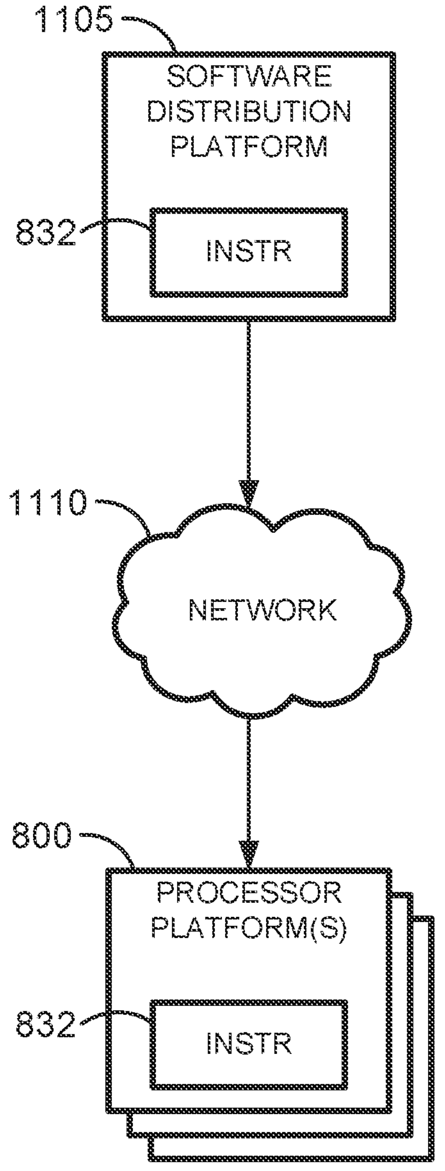
FIG. 11 is a block diagram of an example software/firmware/instructions distribution platform (e.g., one or more servers) to distribute software, instructions, and/or firmware (e.g., corresponding to the example machine readable instructions of FIGS. 5-7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to other hardware devices (e.g., hardware devices owned and/or operated by third parties from the owner and/or operator of the software distribution platform) is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions of FIGS. 5-7, as described above. The one or more servers of the example software distribution platform 1105 are in communication with an example network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions of FIG. 5-7, may be downloaded to the example programmable circuitry platform 800, which is to execute the machine readable instructions 832 to implement the authentication server 108. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices. Although referred to as software above, the distributed "software" could alternatively be firmware.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that improve access tokens by generating alias scopes that (1) reduce a character size of the scopes in the access tokens and (2) hides the scopes in the access token from malicious actors. Disclosed systems, apparatus, articles of manufacture, and methods improve the efficiency of using a computing device by reducing the bandwidth required to transmit access tokens having two or more scopes. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
- interface circuitry;
- machine readable instructions; and
- programmable circuitry to at least one of instantiate or execute the machine readable instructions to:
  - detect a request to create an identity to access an online resource, the request including at least one scope assignment associated with a user of the online resource;
  - determine that an alias has not been created for the at least one scope assignment, the alias to represent two more scopes assigned to the user;
  - generate the alias for the scope assignment, the alias having less characters than the scope assignment, wherein the alias is a hexadecimal value that indicates the user's scope of access to the online resource while obfuscating the scope assignment;
  - generate an Open Authorization access token for the identity to access the online resource from a resource server, the Open Authorization access token including the hexadecimal value in place of the scope assignment; and
  - transmit the Open Authorization access token that includes the hexadecimal value to a client application, the Open Authorization access token enabling the client application to access the online resource from the resource server.

2. The apparatus of claim 1, wherein the programmable circuitry is to update the identity to include the alias and the scope assignment.

3. The apparatus of claim 1, wherein the programmable circuitry is to map the alias to the scope assignment.

4. The apparatus of claim 1, wherein the programmable circuitry is to count a total number of characters in the scope assignment before generating the alias.

5. The apparatus of claim 4, wherein the programmable circuitry is to:
- compare the total number of characters in the scope assignment to a threshold number of characters;
- determine that the total number of characters satisfies the threshold number of characters; and
- generate the alias.

6. The apparatus of claim 1, wherein the alias is at least one of the hexadecimal value or a globally unique identifier.

7. A non-transitory machine readable storage medium comprising instructions to cause programmable circuitry to at least:
- detect a request to create an identity to access an online resource, the request including at least one scope assignment associated with a user of the online resource;
- determine that an alias has not been created for the at least one scope assignment, the alias to represent two more scopes assigned to the user;
- generate the alias for the scope assignment, the alias having less characters than the scope assignment, wherein the alias is a hexadecimal value that indicates the user's scope of access to the online resource while obfuscating the scope assignment;
- generate an Open Authorization access token for the identity to access the online resource from a resource server, the Open Authorization access token including the hexadecimal value in place of the scope assignment; and
- transmit the Open Authorization access token that includes the hexadecimal value to a client application, the Open Authorization access token enabling the client application to access the online resource from the resource server.

8. The non-transitory machine readable storage medium of claim 7, wherein the instructions are to cause the programmable circuitry to update the identity to include the alias and the scope assignment.

9. The non-transitory machine readable storage medium of claim 7, wherein the instructions are to cause the programmable circuitry to map the alias to the scope assignment.

10. The non-transitory machine readable storage medium of claim 7, wherein the instructions are to cause the programmable circuitry to count a total number of characters in the scope assignment before generating the alias.

11. The non-transitory machine readable storage medium of claim 10, wherein the instructions are to cause the programmable circuitry to:
- compare the total number of characters in the scope assignment to a threshold number of characters;
- determine that the total number of characters satisfies the threshold number of characters; and
- generate the alias.

12. The non-transitory machine readable storage medium of claim 7, wherein the alias is at least one of the hexadecimal value or a globally unique identifier.

13. A method comprising:
- detecting a request to create an identity to access an online resource, the request including at least one scope assignment associated with a user of the online resource;
- determining that an alias has not been created for the at least one scope assignment, the alias to represent two more scopes assigned to the user;
- generating the alias for the scope assignment, the alias having less characters than the scope assignment, wherein the alias is a hexadecimal value that indicates the user's scope of access to the online resource while obfuscating the scope assignment;

generating an Open Authorization access token for the identity to access the online resource from a resource server, the Open Authorization access token including the hexadecimal value in place of the scope assignment; and transmitting the Open Authorization access token that includes the hexadecimal value to a client application, the Open Authorization access token enabling the client application to access the online resource from the resource server.

14. The method of claim 13, further including updating the identity to include the alias and the scope assignment.

15. The method of claim 13, further including mapping the alias to the scope assignment.

16. The method of claim 13, further including counting a total number of characters in the scope assignment before generating the alias.

17. The method of claim 16, further including:

comparing the total number of characters in the scope assignment to a threshold number of characters;

determining that the total number of characters satisfies the threshold number of characters; and generating the alias.

18. The method of claim 13, wherein the alias is at least one of the hexadecimal value or a globally unique identifier.

* * * * *